Patented Apr. 21, 1942

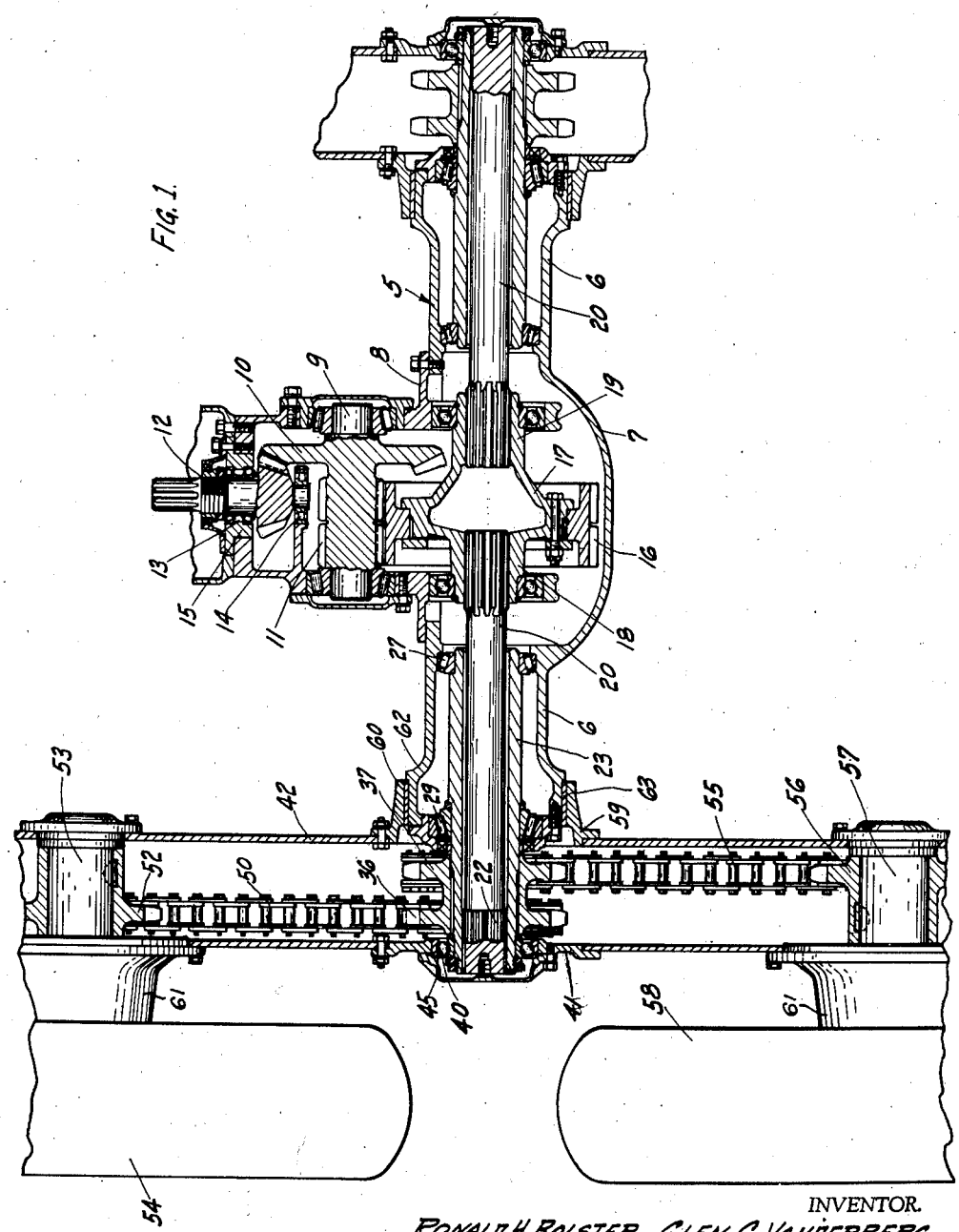

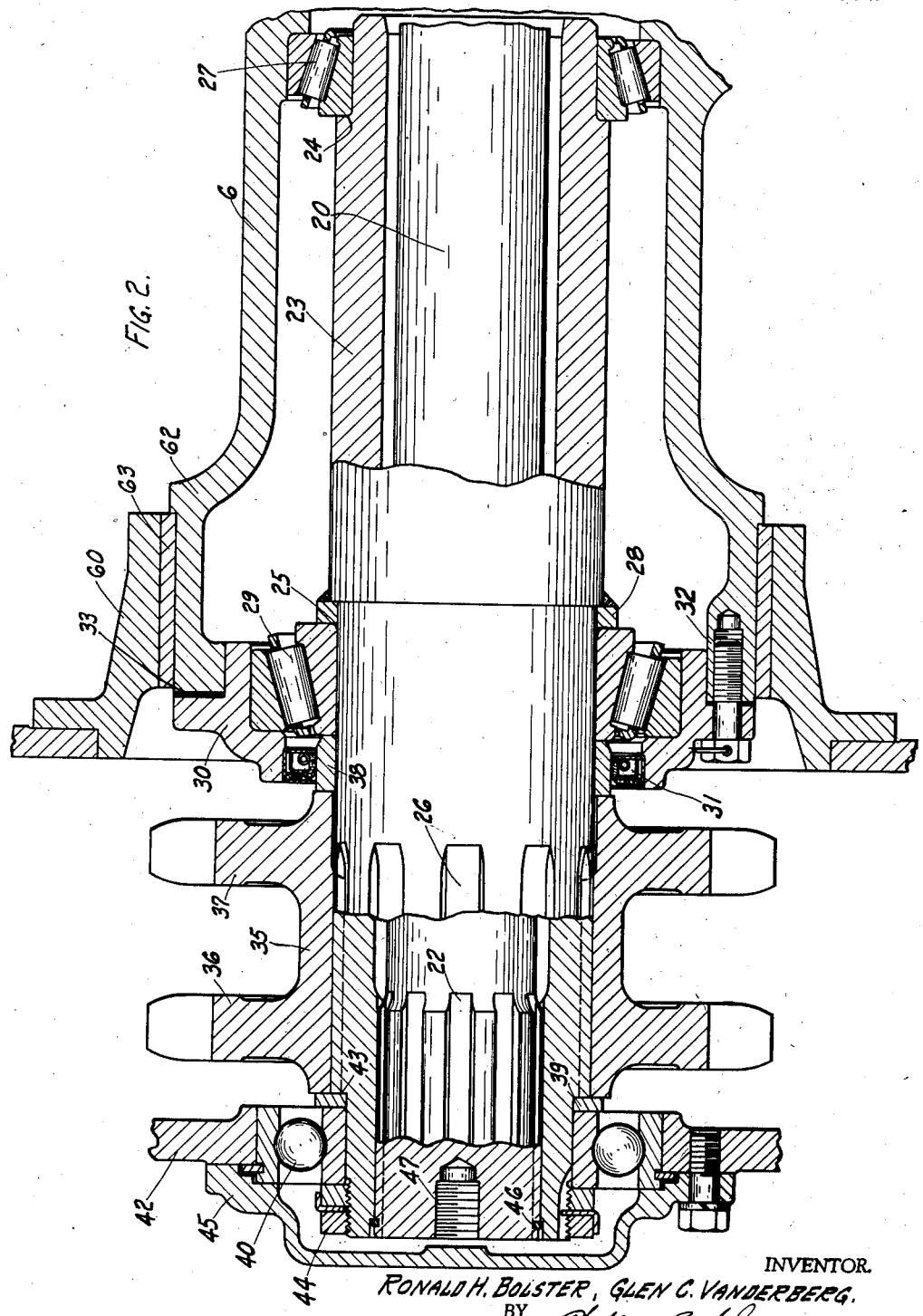

2,280,741

UNITED STATES PATENT OFFICE 2,280,741

AXLE

Ronald H. Bolster and Glen C. Vanderberg, Buchanan, Mich., assignors to Clark Equipment Company, Buchanan, Mich., a corporation of Michigan Application October 21, 1939, Serial No. 300,526

9 Claims. (Cl. 180—22)

This invention relates to axles, and more particularly is directed to an axle assembly of the heavy duty type employed for driving large earthworking equipment, such as road graders, scrapers, excavators and the like, and is particularly adapted for use in driving a pair of longitudinally spaced drive wheels mounted at opposite ends of a gear case which is trunnioned at its center for oscillating movement at the end of the axle shaft. This provides an assembly with four driving wheels driven from one axle, the wheels being chain driven by means of sprockets carried at the opposite ends of the axle.

Considerable difficulty has been encountered heretofore in constructions of this type in providing the proper mounting and bearing support for the axle shaft, while still allowing the same to be accessible for inspection and maintenance in the field. Necessarily, the axle must be of extremely rugged construction, and must be designed in such manner as to insure proper bearing support of the same to take care of the stresses imposed thereon due to the transmission of drive from the shaft in opposite directions to the two wheels.

The present construction has as one of its primary objects the provision of an axle assembly employing a more or less conventional axle housing with extending housing arms to which the wheel gear housing is secured, and which is provided internally with a rotatably mounted supporting sleeve or tube enclosing the axle shaft for taking up the stresses and thrusts imposed by reason of the driving arrangement without allowing the same to be transmitted to the axle shaft. This tube is so designed that the driving connection between the axle shaft and the drive sprockets is effected through the intermediary of the tube end, the sprockets being splined on the external surface of the tube and the internal surface of the tube, and being splined to receive the end of the axle shaft. The tube itself is supported by three axially spaced bearings, two of which are located within the axle housing, while the outer end of the tube is rotably supported in the casing carrying the wheel spindles.

Another feature of the present invention is the provision of a structure in which the entire wheel assembly can be readily removed from the axle housing arm, and the tube and axle shaft can also be removed in the field without the necessity of complicated equipment. In this connection the design is so arranged that by removing the bearing cap at the end of the axle shaft the sprockets, supporting tube and gear teeth can be removed from the housing arm, or the axle shaft itself may be removed for replacement or repair.

Still another feature of the present invention is the simplification of design so as to require relatively few parts, which are of a construction such as to eliminate complicated machining operations or forming operations, and which can be readily carried in stock for service.

Other objects and advantages of the present invention will be more apparent from the following detailed description which, taken in conjunction with the accompanying drawings, will disclose to those skilled in the art the particular construction and operation of a preferred form of the present invention.

In the drawings:

Figure 1 is a transverse sectional view through an axle embodying the present invention; and Figure 2 is an enlarged sectional view of one end of the axle assembly.

Referring now in detail to Figure 1, there is provided an axle housing 5 which comprises the tubular extending arms 6 having a central frame or housing 7 to which is bolted the carrier 8. Preferably, axles of this type are of the double reduction type and the carrier 8 is designed to provide a double reduction axle, this carrier containing a transverse intermediate shaft 9 upon which is mounted the ring gear 10 and the double driving gear 11. The ring gear 10 is adapted to be driven from the pinion shaft 12 connected to the propeller shaft of the power unit, which pinion shaft is straddle mounted by means of the bearings 13 and the bearings 14, the bearings 13 being carried in a bearing cap 15 secured to the extending end of the carrier. The intermediate shaft 9 thereby receives torque from the pinion shaft 12 and this torque is transmitted through the gears 11 to the herringbone ring gear 16 bolted or otherwise suitably secured to the case 17, which is more or less conventional design having oppositely extending splined journals 18 and 19 mounted in suitable bearings carried by the carrier 8, and adapted to receive the drive shafts 20, these drive shafts being splined to engage in the journals 18 and 19. It will be noted that no differential is employed in this construction since it is a very low speed vehicle and has a very large turning radius.

At their opposite ends the drive shafts 20 are splined as indicated at 22 for driving engagement with tubular members 23, the members 23 shown more in detail in Figure 2 being provided with bearing seat portions 24 and 25 and being externally splined as indicated at 26 adjacent the splined end 22 of the drive shaft.

The bearing seat portion 24 formed at the inner end of the member 23 is adapted to receive the tapered bearing assembly 27 for rotatably supporting this end of the member 23 in the housing arm 6, as clearly shown in Figure 2. The member 23 has a reduced portion forming a radial shoulder against which is disposed the ring 28, this ring forming an abutment for the bearing assembly 29 carried on the bearing seat 25 which forms a rotatable support for the member 23 intermediate its ends. The bearing assembly 29 is located in position by means of a bearing cap 30 bolted or otherwise secured to the end 32 of the housing arm 6, whereby the tubular member 23 is rotatably journaled in the housing arm about the drive shaft 20.

Preferably, a lubricant seal 31 is provided in the bearing cap 30 for sealing the interior of the housing arm against escape of lubricant outwardly of the end thereof. Suitable shims 33 may be provided for adjusting the position of the bearing cap member 30 to locate the bearing assemblies 27 and 29 in proper position.

Mounted on the splined portion 26 of the tubular member 23 is a double sprocket 35 having the sprocket portions 36 and 37, respectively, this sprocket being held against axial movement by abutment against the spacer member 38 which is interposed between the inner race of the bearing assembly 29 and the inner end face of the sprocket 35, and is locked against movement outwardly by abutment against the ring 39 interposed between the outer end of the sprocket 35 and the inner race of a ball bearing assembly 40 which rotatably supports the inner end of the flange plate 41 of the gear case or housing 42 for rotation about the end of tube 23. It will be noted that the tubular member 23 is provided with the radial shoulder 43 at the end of the splined portion 26 and a suitable bearing lock nut 44 is threaded over the end of the member 23 to lock the bearing assembly 40 in position on the member 23. A bearing cap 45 is bolted to the face of the flange 41 for locking the outer race of the bearing assembly 40 in position, and encloses the bearing and the ends of the tubular member 23 and drive shaft 20. Preferably, a suitable lock ring 46 is provided on the end of the splined portion 22 of the axle shaft 20 to lock the axle shaft against inward axial movement with respect to the tubular member 23, this ring abutting against an internal shoulder formed in the end of the member 23. The end of the axle shaft 20 is tapped as indicated at 47 to receive a shaft puller screw for removing the shaft axially outwardly through the member 23 to provide for inspection or replacement thereof.

The sprocket 36 is adapted to receive a chain 50 which is trained thereover and which extends forwardly in the case 42 and is trained about a corresponding sprocket 52 secured to the wheel spindle 53 which is rotatably journaled in the forward end of the case 42 and provides for driving engagement to the wheel 54 supported at the forward end of the case. Similarly the sprocket 37 has a chain drive through the chain 55 to the wheel sprocket 56, which is keyed to the driving spindle driving the wheel 58 journalled in the rear end of the case 42. The wheels 54 and 58 are keyed to the spindles 53 and 57, respectively, which are carried in suitable bearing journals contained within the sleeves 61. The sprockets 52 and 56 are keyed to the spindles 53 and 57 in any conventional manner.

It will be noted that the case 42 on its inner face is provided with the cap member 59 which is bolted thereto and which has an extending flange portion 60 having pivotal engagement about an enlarged portion 62 of the housing arm 6, by means of the bushing 63, thereby journalling the case 42 for rotative movement relative to the housing arm. It will be seen that the case or housing 42 therefore provides the spindle support for the wheels 54 and 58, and is rotatably secured about the end of the housing arm.

Enclosed within this case are the driving connections between each wheel spindle and the driving sprockets carried at the end of the tubular member 23. This tubular member in turn is amply supported for rotation with respect to the housing arm and the bearing case by means of the bearings 27 and 29 so as to withstand the opposite thrusts imparted thereto through the driving connections, and also to take care of the torque resulting from its connection to the drive shaft 20. It will also be apparent that the entire assembly may be removed outwardly from the housing arm with little or no difficulty by removal of the bearing 40 and the sprocket 35, which will allow access to the bearing cap 30 which, upon removal, will allow withdrawal of the tube 23 outwardly of the housing arm 6. The axle shaft is so designed that it may be readily removed merely by the removal of cap 45. This greatly facilitates the maintenance and servicing of the axle, allowing ready inspection of all parts of the driving connection between the wheels and the axle shaft.

We are aware that various changes may be made in certain details of the present construction, and therefore we do not intend to be limited except as defined by the scope and spirit of the appended claims.

We claim:

1. In an axle assembly, a housing arm terminating in an enlarged external bearing portion, a tubular member rotatably journalled in said arm and having internal and external splines at the outer end thereof, an axle shaft within said tubular member and having splined engagement with the end thereof, a wheel supporting housing rotataby journalled on the bearing portion of said arm and the outer end of said tubular member, wheels rotatably journalled in opposite ends of said housing, and fore and aft driving connections in said housing between said tubular member and said wheels.

2. In combination, an axle housing arm having axially spaced internal bearings and a radially enlarged external bearing at the outer end thereof about one of said internal bearings a tubular member rotatably journalled on said internal bearings within said arm and extending axially therebeyond, an axle shaft within said tubular member having driving engagement with said extending end of said tubular member, and a fore and aft wheel supporting housing trunnioned intermediate its ends on said external arm bearing and on the end of said tubular member.

3. The combination of claim 2 further characterized in that the driving connection between said tubular member and said axle shaft is disposed radially inwardly of the internal diameter of said tubular member, and the external diameter of said shaft is such that it can be withdrawn axially outwardly through said tubular member.

4. In combination, an axle assembly including a housing arm having a radially enlarged end, a tubular member rotatably journalled in said arm and projecting beyond said end, an axle shaft adapted to be passed through said tubular member and having splined engagement with the projecting end of said member, means limiting inward movement of said shaft, a fore and aft wheel supporting housing having means intermediate its ends journalling it on said arm end and the outer end of said tubular member, and drive means within said housing for driving the wheels from said tubular member.

5. The combination of claim 4 further characterized in that said drive means comprises a double sprocket splined on said tubular member intermediate said housing journals.

6. The combination of claim 4 further characterized in the provision of a cap member secured to said housing over the end of said shaft and tubular member for retaining said housing against axial movement.

7. In combination, an axle housing arm having a radially enlarged end, a bushing carried thereon, a tubular member within said arm having bearing support therein and having a splined end projecting axially beyond said arm end, a bearing mounted on the end of said tubular member axially outwardly of the splined portion thereof, a fore and aft wheel housing journalled intermediate its ends on said bushing and bearing, an axle shaft extending through said tubular member and having driving connection to the splined end thereof, wheels journalled at opposite ends of said housing and driving connections in said housing between each of said wheels and said splined end of said tubular member.

8. In combination, an axle housing arm, a tubular member rotatably journalled therein and projecting from one end thereof, said member being both internally and externally splined at said projecting end, a fore and aft wheel supporting housing journalled intermediate its ends on the end of said arm and the end of said tubular member, and driving means for said tubular member including a drive shaft extending through said arm and tubular member, said shaft being splined at each end with the splines at the outer end being of greater pitch diameter and axially slidable into said internal splines of said tubular member whereby said shaft can be passed outwardly through said tubular member.

9. In an axle assembly, a housing arm having axially spaced internal bearings, an external bearing about the outer internal bearing, a tubular sleeve journalled in said internal bearings and projecting beyond the outer end of said arm, drive means extending through said sleeve and having driving engagement therewith at the projecting end thereof, drive transmitting means on the projecting end of said sleeve about said engagement of said drive means therewith, and a fore and aft wheel supporting housing journalled on the outer end of said tubular sleeve and on said external bearing, said sleeve being supported against bending stresses by said internal bearings and being free of any torsional stresses.

RONALD H. BOLSTER.
GLEN C. VANDERBERG.